(No Model.)
J. J. RICHARDSON.
COOKING RANGE.
No. 267,591. Patented Nov. 14, 1882.
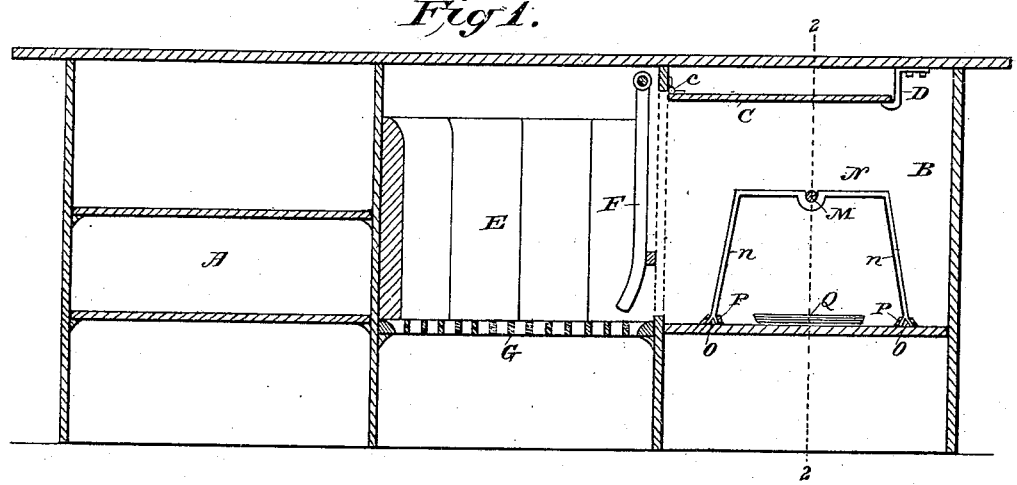
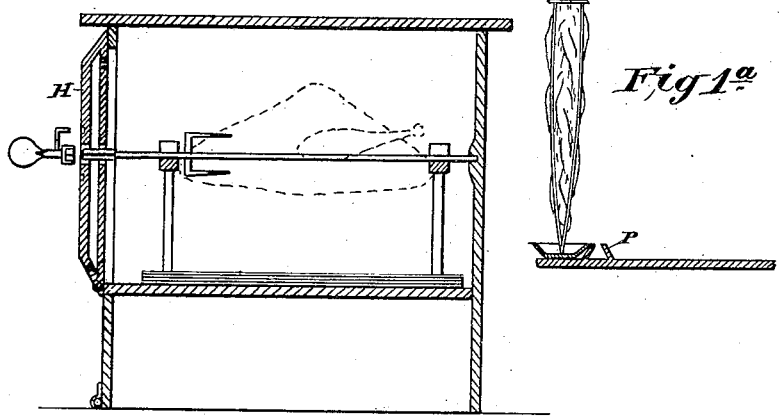
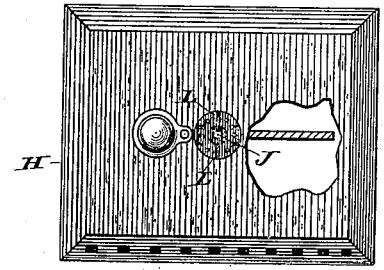
Attest.
Geo. T. Smallwood Jr.
Wm. G. Sayers.
Inventor:
Jeremiah J. Richardson,
By Knight Bros.
attys.

UNITED STATES PATENT OFFICE.

JEREMIAH J. RICHARDSON, OF BROOKLYN, NEW YORK.

COOKING-RANGE.

SPECIFICATION forming part of Letters Patent No. 267,591, dated November 14, 1882.

Application filed June 27, 1882. (No model.)

*To all whom it may concern:*

Be it known that I, JEREMIAH J. RICHARDSON, a citizen of the United States, residing at Brooklyn, in the county of Kings and State of New York, have invented certain new and useful Improvements in Cooking-Ranges, of which the following is a specification.

My invention consists, in part, in a roasting and broiling oven which is applicable to single ranges, but possesses special advantages in its application to double ranges, using one cast and one wrought iron oven. The side of the oven next to the fire is hinged, so as to serve as a door, which can be turned up against the roof of the oven and secured by a catch when it is desired to expose the interior of the oven to the direct radiation of the fire through vertical grate-bars. When the door is turned up from these grate-bars the objects contained in the oven are exposed to the direct action of rays of heat from the fire. The outside door, giving access to the oven, is made double, and is provided with inlet-openings for cold air at the bottom of its outer plate, and with openings for admitting heated air into the oven at the top of its inner plate. In this manner a free and perfect circulation of heated air takes place in the oven at all times, making in this way a perfect roasting-oven. The double door is also provided with a spit-socket adapted to receive a key, by which the spit may be turned as often as required to expose different sides of the "roast" to the direct action of the fire, or it may be constantly turned by a jack. The spit is supported and turns on a carriage, which has feet sliding on ways or rails at the bottom of the oven-chamber, so that said carriage can be drawn out for applying or removing the spit.

In the accompanying drawings, Figure 1 is a front view of a range illustrating the invention with the oven-door open and the side door within the oven turned up, as in roasting. Fig. 1ª is a detail view, showing the broiler in position. Fig. 2 is a vertical transverse section on the line 2 2, Fig. 1, showing both doors closed. Fig. 3 is a face view of the outer oven-door, showing the air-inlet openings at the bottom thereof.

A may represent a cast-iron oven of any approved construction, and B a wrought-iron roasting and broiling oven, having a side door, C, hinged at $c$ by its upper edge, and adapted to be turned and fastened by a catch, D, within the roof of the oven, as illustrated in Fig. 1, when the oven is to be used for roasting or broiling by direct radiation from the fire-chamber E. A side grate is shown at F with vertical bars to expose the interior of the oven to the fire, and a horizontal bottom grate at G. The space $g$ between them admits a slicer. The door H of the oven B is made double, with a space between its inner and outer shells, as shown in Fig. 2. This door is provided with a row or series of openings, $h$, in the bottom of its outer plate or wall, and with a series of openings, $h^2$, in the top of its inner plate or wall, and a division-plate, $h^3$, is also located in the space between the two walls. A door of this construction is designed for heating fresh air, admitted through the bottom openings and discharged into the oven through the top openings, and is precisely the same, so far as these particulars are concerned, as the door illustrated in my Patent No. 124,388, dated March 5, 1872. In the center of the door is an opening, which permits the application of a key, I, to the exposed square end J of the spit for rotating the roast. On the spit-key I is an arm, K, terminating in a pin, $k$, to engage in any one of the circular range of holes or notches L, for the purpose of holding the spit in any position to which it may be set. The spit M has its bearings in a carriage, N, consisting of a frame, the legs $n$ of which flare downward, and are provided with feet O, of inverted-V shape, to fit and slide on or in corresponding rails or ways, P, prepared for them on the bottom of the oven. This arrangement permits of readily sliding the carriage in and out of the oven, as in introducing, inspecting, or removing a roast. When the door is closed the spit M may be rotated by the key I, applied to the external square J, as before explained. A basting-pan is shown at Q, between the legs of the spit-carriage.

My improved oven, with side exposed to the fire, admits of the convenient and effective application of a broiler such as is in common use.

I am aware that it is not broadly new to make provision in a cooking-stove for carrying on not only the process of baking in a closed oven, but also permitting the radiation of heat through an open grate or fire-back, whereby roasting may be effected in the oven. I am also aware that a pivoted door or plate mounted on a shaft carrying a counterbalance-weight has been resorted to for closing said open grate and converting the oven into a closed baking-chamber. In my present invention I combine the advantages of such a door and open fire-back with the double door found in my Patent No. 124,388, since it will be evident that air admitted in a heated state at the top of the oven will freely circulate therein and come in contact with the meats undergoing the roasting operation, and then pass into the fire through an open back or grate extending the entire height and width of the oven.

Having thus described my invention, what I claim, and desire to secure by Letters Patent, is—

1. In a range, the combination of the open fire-back or vertical grate and the falling door C hinged at its upper end, and the double door provided with air-inlet openings at its bottom and air-outlet openings at its top, with the oven-chamber and a suitable catch for retaining the falling door in a raised position, as and for the purpose set forth.

2. In a range, the oven-chamber having bottom ways or rails, P, and the removable spit frame or carriage N, provided with feet O, fitting into or on said ways, as and for the purpose set forth.

3. The combination of the door H, having an opening, the spit-shaft fitted therein, and the key I for holding and turning the spit, adapted to be inserted into said door-opening, with the oven-chamber and the spit-supporting frame located therein, as and for the purpose set forth.

4. The combination of the key I, having the arm K and pin k, and the oven-door H, provided with a key-opening and the notched or perforated plate L, surrounding the same, with the oven-chamber and the spit located therein, as and for the purpose set forth.

JEREMIAH J. RICHARDSON.

Witnesses:
GEO. A. BOYNTON,
CHARLES B. BOYNTON.